United States Patent [19]
Luther et al.

[11] 3,817,477
[45] June 18, 1974

[54] DEPLOYABLE ANNULAR SOLAR ARRAY

[75] Inventors: Elmer M. Luther, El Segundo; Setsuo A. Okumura, Manhattan Beach, both of Calif.

[73] Assignee: TRW Inc., Redondo Beach, Calif.

[22] Filed: July 6, 1971

[21] Appl. No.: 159,726

[52] U.S. Cl. ............................................. 244/1 SS
[51] Int. Cl. ............................................. B64g 1/10
[58] Field of Search .......... 244/1 SS, 77 SS; 136/89; 343/915; 250/108 FS, 239; 245/145, 188, 282; 240/46.09, 108, 109, 144, 145

[56] References Cited
UNITED STATES PATENTS

| | | | |
|---|---|---|---|
| 3,286,259 | 11/1966 | Carman et al. | 343/915 |
| 3,473,758 | 10/1969 | Valentijn | 244/1 SS |
| 3,532,299 | 10/1970 | Williamson et al. | 244/1 SS |
| 3,544,041 | 12/1970 | Billerbeck, Jr. | 244/1 SS |

*Primary Examiner*—Duane A. Reger
*Assistant Examiner*—Jesus D. Sotelo
*Attorney, Agent, or Firm*—Daniel T. Anderson; Donald R. Nyhagen; Jerry A. Dinardo

[57] ABSTRACT

A deployable spacecraft solar array having an annular thin-film solar panel circumferentially surrounding a spacecraft body and supported on the body by hinged frames which are swingable inwardly to retracted positions against the body to contract the panel to a launch configuration with an effective diameter approximating the body diameter and outwardly to radial extended positions to expand the panel to a deployed configuration with a diameter substantially greater than the body diameter and hence a surface area substantially exceeding the body surface area.

18 Claims, 10 Drawing Figures

Elmer M. Luther
Setsuo A. Okumura
INVENTORS

BY
ATTORNEY

Elmer M. Luther
Setsuo A. Okumura
INVENTORS

Elmer M. Luther
Setsuo A. Okumura
INVENTORS

BY Donald R. Nyham
ATTORNEY

Elmer M. Luther
Setsuo A. Okumura
INVENTORS

DEPLOYABLE ANNULAR SOLAR ARRAY

BACKGROUND OF THE INVENTION

1. Field of the Invention

This invention relates generally to the space field and more particularly to a novel deployable solar array for spacecraft.

RELATED APPLICATIONS

This invention is related to the invention disclosed in copending application Ser. No. 199,539, filed Nov. 17, 1971, entitled "A Deployable Solar Array for a Spin Stabilized Spacecraft," and assigned to the assignee of this application.

2. Prior Art

Spacecraft are commonly equipped with solar arrays for converting solar energy to electrical energy. In order to satisfy the electrical power requirements of most spacecraft, the effective area of the array must be relatively large. For this reason many spacecraft are equipped with deployable solar arrays which may be retracted to a compact configuration for launch and then deployed to operating position in space. Other spacecraft, such as spin stabilized satellites have a cylindrical body, the outer cylindrical surface of which mounts solar cell about its entire circumference to form a solar panel. Heretofore, such cylindrical solar panels have been limited in diameter and surface area by the spacecraft body dimensions.

SUMMARY OF THE INVENTION

The present invention provides a deployable annular solar array for spacecraft, particularly spin stabilized spacecraft with a cylindrical body. The solar array for an annular foldable solar panel which may comprise solar cells mounted on a thin-film substrate. This solar panel surrounds the spacecraft circumferentially and has a circumferential length substantially exceeding the circumferential dimension of the spacecraft body, such that the panel may assume a generally annular deployed configuration concentric with the body in which the panel has a diameter substantially larger than the body.

The solar panel is mounted on the spacecraft body by means of frames which are hinged to the body at positions spaced circumferentially about the body and are attached along their outer edges to the panel. When the solar panel is in its deployed configuration, these frames extend radially outwardly from the body to support the panel in generally concentric relation to the body. The frames are foldable generally circumferentially of and inwardly against the body to retracted position to contract the solar panel to a launch configuration. In this launch configuration, the solar panel has a diameter approximating the body diameter.

This contraction of the solar panel requires that the slack, i.e. excess circumferential length, of the panel be taken up in some way. The invention provides different ways of taking up this excess panel length. According to one method, for example, the solar panel is folded on transverse fold lines parallel to the central body axis. Various ways of folding are disclosed. According to another method of taking up the slack of the solar panel, the latter is attached to spring loaded drums along the outer edges of the solar array frames. When the frames are folded to their retracted positions, the drums rotate under spring action to wind up the panel on the drums. During outward folding of the frames to their extended or deployed positions, the solar panel unwinds from the drums.

The solar array may be deployed in various ways. For example, in the case of a spin stabilized spacecraft, the array frames may be retained in their retracted positions by straps or cables which are severed to release the frames for deployment under the action of centrifugal force. Alternatively, springs or other means may be utilized to drive the frames to deployed position.

DESCRIPTION OF THE PREFERRED EMBODIMENTS

Figure 1:
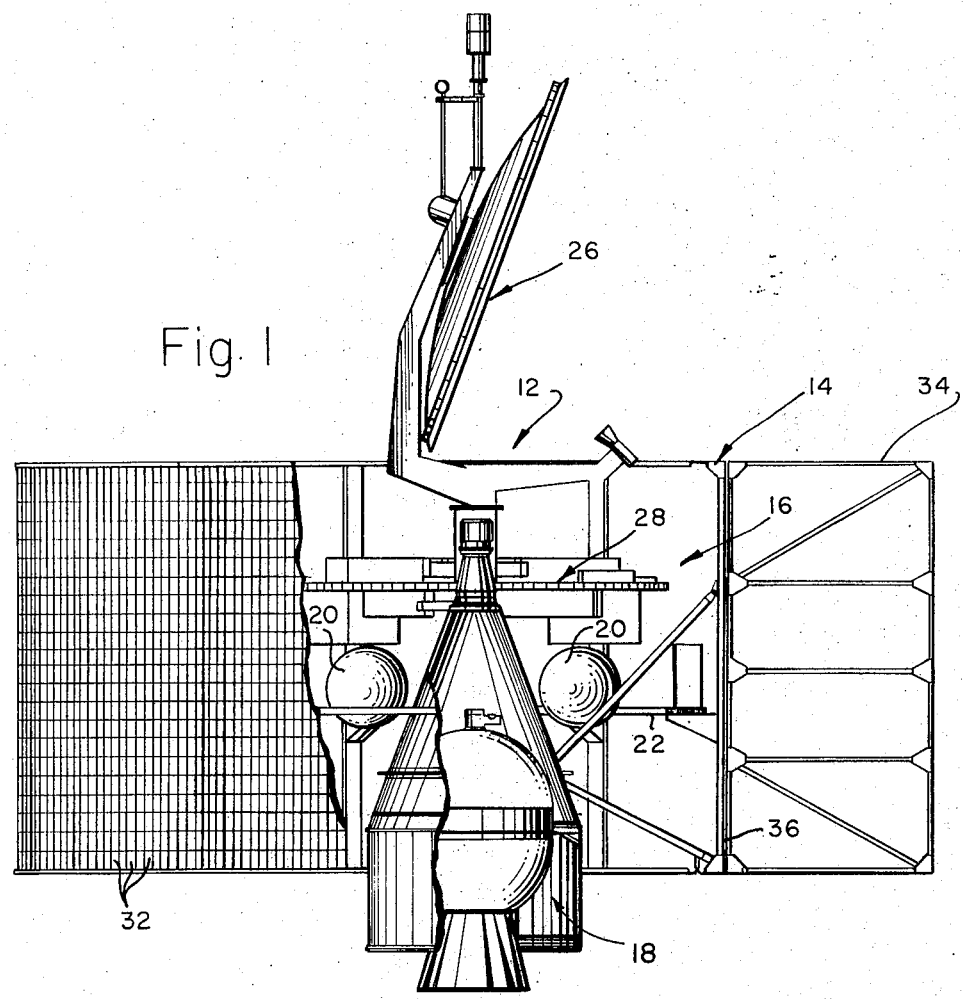
FIG. 1 is a side elevation partly broken away and sectioned of a spacecraft mounting a solar array according to the invention and showing the array deployed.
Figure 4:
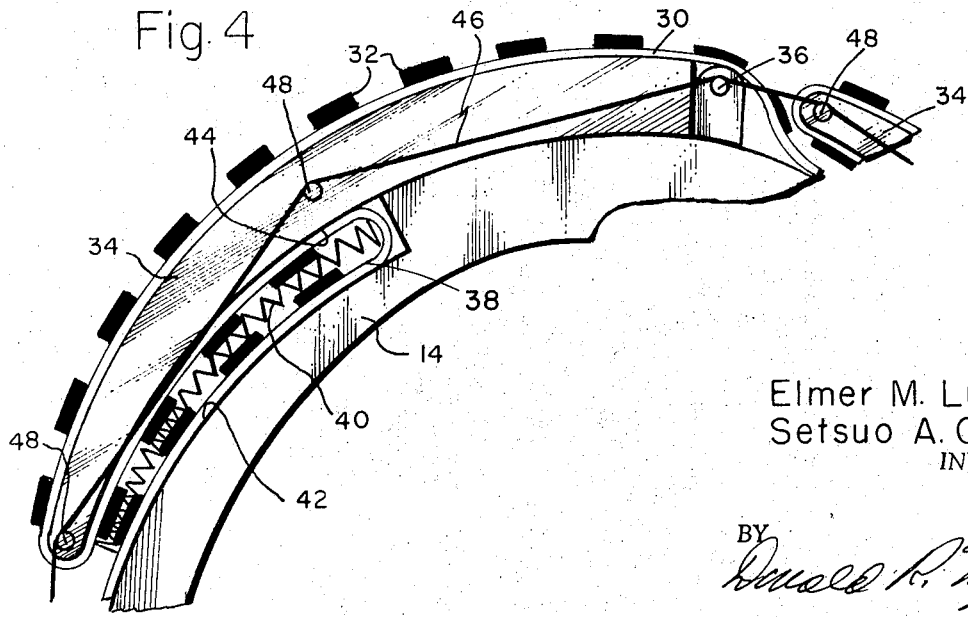
FIG. 4 is a further enlarged fragmentary section through the stowed solar array.

FIGS. 1 through 4 illustrate a deployable solar array 10 according to the invention installed on a spacecraft 12, which in this instance is a spin stabilized communication satellite. The spacecraft has a cylindrical body 14 containing the various operating components 16 of the craft. These components have no direct relation to the invention and hence need not be described in elaborate detail. Suffice it to say that the components 16 include an apogee motor 18 and its support structure and fuel tanks 20, equipment platforms 22, communication and other equipment 24, antennae 26, and a despun mechanism 28 for the antennae.

The present solar array 10 includes an annular solar panel 30 mounting solar cells 32 on its outer surface about the full circumference of the panel. Solar panel 30 comprises a foldable thin-film substrate of Mylar, Kapton or other suitable substrate material to which the solar cells 32 are bonded or stitched. The panel surrounds the spacecraft body 14 circumferentially and has a full circumferential length exceeding substantially the circumferential dimension of the body. Hinged frames 34 support the solar panel on the spacecraft body. Each frame has a light-weight open frame construction and may be fashioned from light-weight tubing or the like.

Frames 34 are spaced uniformly about the spacecraft body 14 with opposite longitudinal edges of the frames parallel to the body axis. Each frame is attached along one longitudinal edge to the body by hinges 36 for swinging of the frames on hinge axes parallel to the central axis of the body. Each frame is attached along its opposite longitudinal edge to the inner surface of the solar panel substrate 30.

Figure 2:
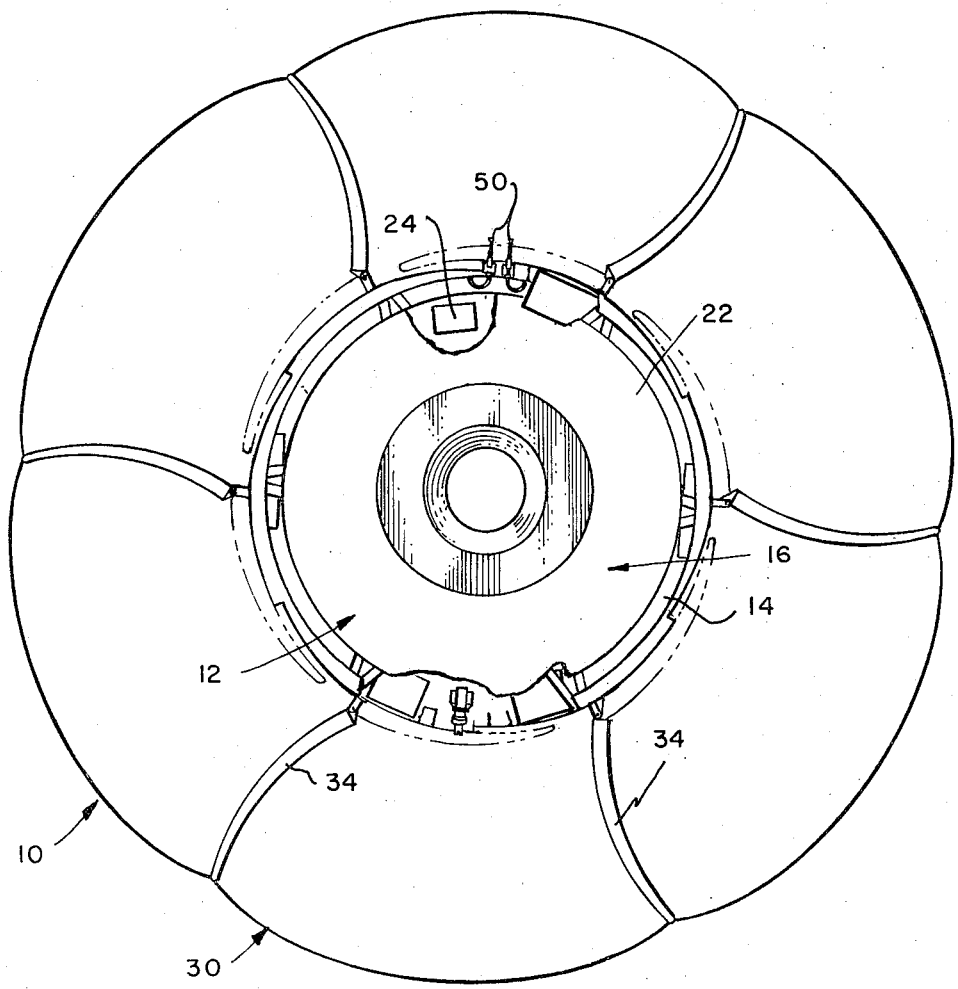
FIG. 2 is a bottom view of the spacecraft.
Figure 3:
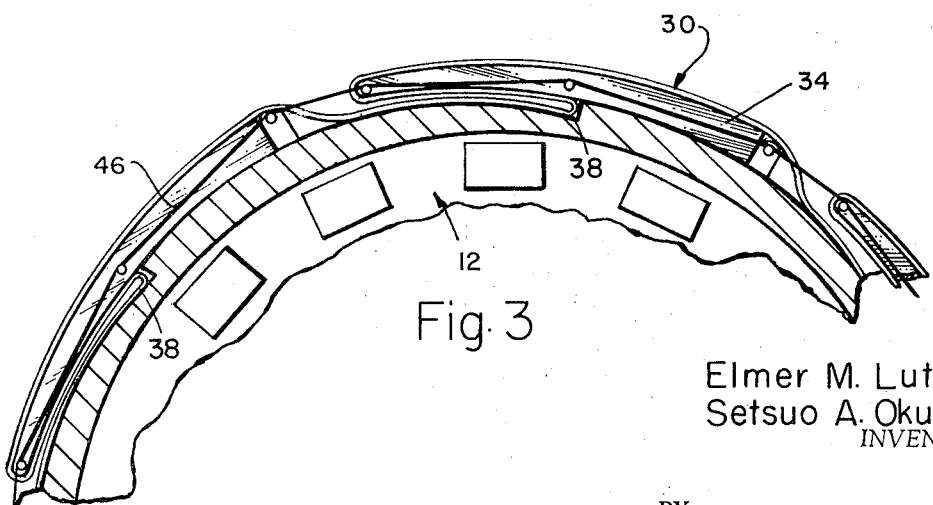
FIG. 3 is an enlarged fragmentary section through the solar array in its stowed configuration.

The solar array frames 34 are foldable inwardly on their hinge axes to folded or retracted positions to contract the solar panel 30 to its launch configuration of FIG. 3 and outwardly to extended position to expand the panel to its deployed configuration of FIG. 2. In their retracted positions, the frames rest against and extend in the same direction about the circumference of the spacecraft body. In the particular inventive embodiment illustrated, the outer surface of the body is cylindrical and the frames 34 are cylindrically curved in transverse cross-section to match the curvature of the body. If desired, however, the spacecraft body may have flat sides circumferentially coextensive with the frames in their retracted positions, in which case the frames may be flat. In their extended or deployed positions, the frames extend out from the body in generally radial planes of the body containing the body axis.

When the panel support frames 34 are folded inwardly to contract the solar panel 30 to its launch configuration, slack is produced in the panel between the frames which must be taken up. This may be accomplished in various ways. In the particular inventive embodiment under discussion, the panel slack is taken up by folding the panel in transverse fold lines parallel to the axis of the spacecraft body 14 under each folded frame 34 in such a way that the panel extends from the outer edge of each frame back under the frame between the latter and the spacecraft body, and then back on itself in a reverse bend to the outer edge of the following frame. The solar cells 32 are omitted along the panel fold lines. Also, in order to prevent damage to the cells within the panel folds 38, wherein the cells are disposed face to face, a protective sheet 40 of crumpled Kapton or the like is placed within each fold. Also, the body 14 and each panel support frame 34 are provided with surfaces 42, 44 between which the intervening fold is firmly clamped in the launch configuration of the solar array.

Retention of the solar array 10 in its launch configuration and deployment of the array may be accomplished in various ways. In the case of a spin stabilized spacecraft, such as that illustrated, deployment may be accomplished by centrifugal force. To this end, the illustrated solar array is retained in its launch configuration by straps 46 which encircle the spacecraft body 14 and pass around pins 48 on the ends of the solar panel support frames 34 to retain the frames firmly folded against the body, such that the panel folds 38 are firmly clamped between the body and frames, as mentioned earlier. The straps 46 are severed in space by pyrotechnic cutters 50 to release the array for deployment under centrifugal force. If desired or necessary, stops may be provided to limit outward swinging of the frames 34 to their extended or deployed positions and dampers or cushioning means may be provided for limiting the rate of outward swing of the frames and/or cushion the impact of the frames upon their arrival in extended position. If the spacecraft does not spin, such that centrifugal force cannot be used for deployment, springs or other means may be provided for deploying the frames and thereby the solar array. In either mode of deployment, latch means may be provided for latching the frames in extended position.

The solar panel 30 may be so circumferentially dimensioned that it assumes a generally polygonal, generally cylindrical, or generally lobed configuration when deployed by centrifugal force. The illustrated panel assumes a lobed configuration, as shown. This configuration is desirable since it possesses a greater effective solar surface area.

Figure 5:
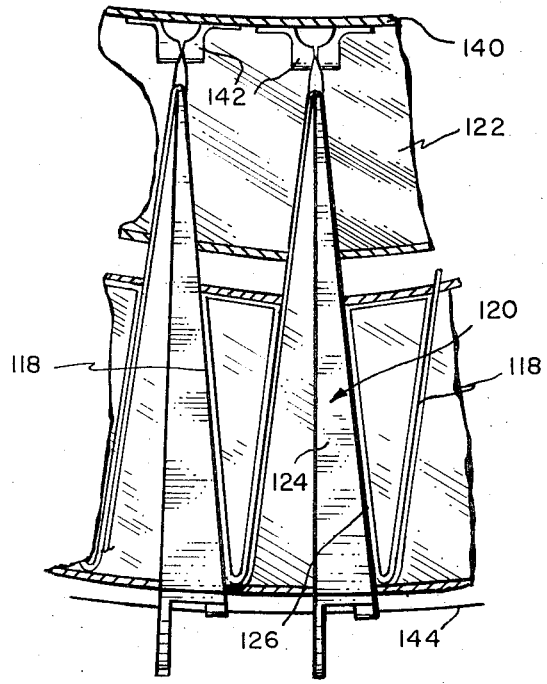
FIG. 5 is an enlarged fragmentary section through a modified solar array according to the invention.
Figure 6:
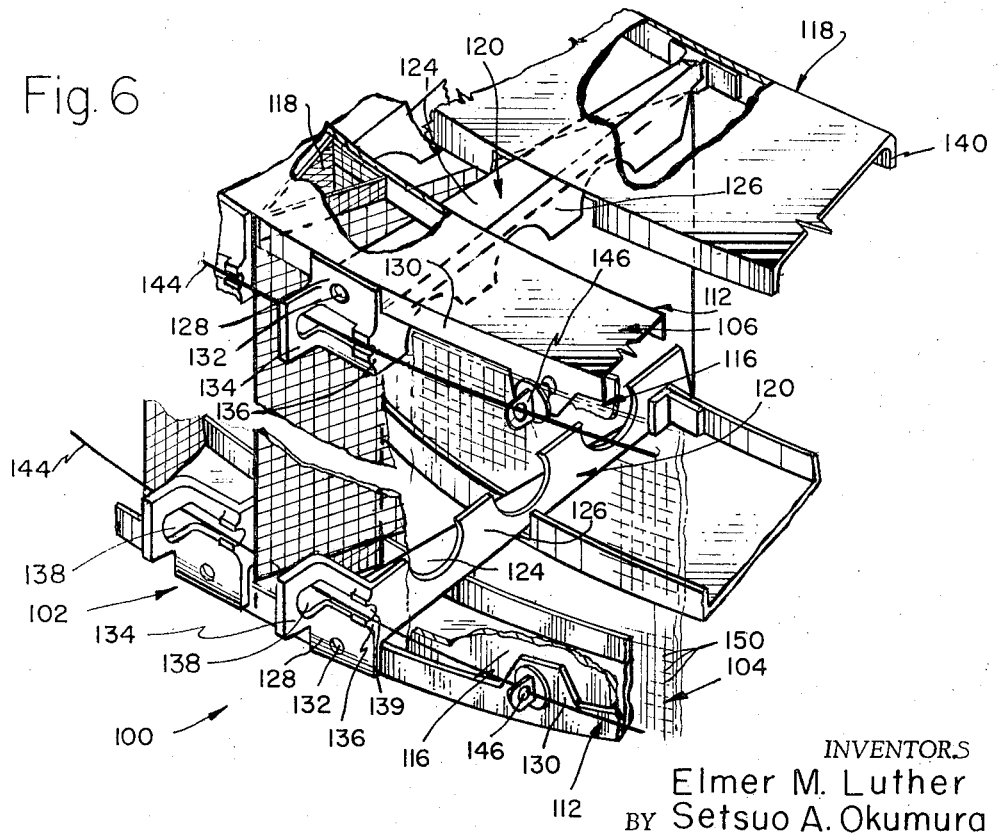
FIG. 6 is a fragmentary perspective view of the modified solar array.
Figure 7:
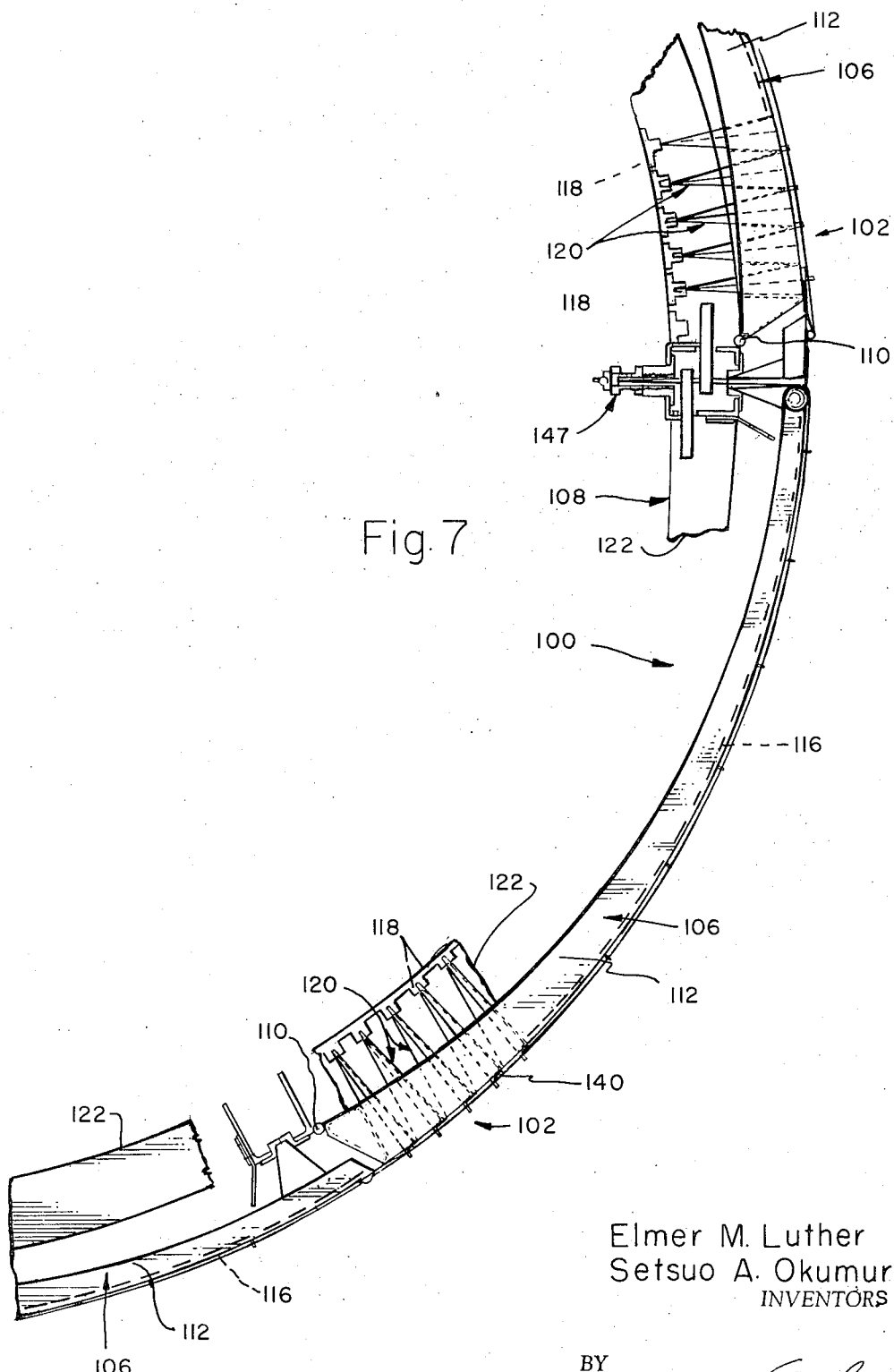
FIG. 7 is a fragmentary plan view of the modified solar array.

In the modified solar array 100 of FIGS. 5 through 7, portions 102 of the solar panel 104 are folded accordion fashion when the panel is in its stowage configuration to take up the panel slack. This modified solar array has a number of hinged solar panel support frames 106 spaced circumferentially about and curved to conform to the external curvature of the spacecraft body 108. Each frame is pivotally attached along its inner edge to the body by a hinge 110 for swinging between its folded or retracted stowage position illustrated wherein the frame lies against the body and an extended deployed position wherein the frame extends radially out from the body.

Each frame 106 has curved upper and lower arms 112 joined for a portion of their length from their outer ends toward the frame hinge by a lightweight panel 116 which conforms to the curvature of the arms. The panel terminates in spaced relation to the inner ends of the arms. Within the space between the inner edge of the panel 104 and the inner ends of the frame arms 112 are a number of wedge shaped solar panel formers 118 constructed of screen mesh or other lightweight material. Each former extends between and is joined at its ends to the frame arms with the apex edge of the former outermost.

Between each pair of adjacent formers 118 are a pair of tapered solar panel stiffeners 120. When the solar array is in its illustrated stowed configuration, the stiffeners extend radially in from the arms 112 of the folded panel support frames 106 to upper and lower annular channels 122 of the spacecraft body 108 with the apex ends of the stiffeners innermost. Each stiffener has an L-shaped channel section and includes right angle flanges 124, 126. Flanges 124 are tapered and disposed in planes normal to the spacecraft body axis. Flanges 126 are scalloped and disposed in planes parallel to the body axis. The flanges 126 of the upper and lower stiffeners extend toward one another.

At the outer end of each stiffener 120 is an integral plate 128 normal to the longitudinal axis of the stiffener. Plates 128 project above and below the stiffener flanges 124. The outer projecting plate portions, i.e. the upper projecting plate portions of the upper stiffeners and the lower projecting plate portions of the lower stiffeners, seat against the outer surfaces of outer flanges 130 on their respective frame arms 112. These plate portions have holes which slidably receive projecting locating pins 132 on the arm flanges 130. The opposite or inner projecting stiffener plate portions have radially outwardly directed flanges 134 and lugs 136 along their opposite edges. The inner plate portions and plate flanges are slotted at 138. The plate lugs 136 have grooves 139 longitudinally aligned with the slots.

Secured to the inner flanges 140 of the spacecraft body channels 122 are brackets 142. These brackets are slotted, as shown, to seat the inner apex ends of the stiffeners 120 when the solar array is stowed.

The solar panel support frames 106 are retained in their folded or stowed positions by cables 144. These cables extend about the outer edges of the frame arms 112, through the stiffener plate slots 138, lug grooves 139, and a number of aperatured retaining pins 146 spaced along the arms. These retaining pins are removably fitted in holes in the outer arm flanges 130 and serve to support the cables at intervals. One or more explosive actuated cable cutter 147 are provided for severing the retaining cables 144 and thereby releasing the frames 106 to swing outwardly to their extended or deployed positions under centrifugal force in the case of a spin stabilized spacecraft or by spring action.

Solar panel 104 has a flexible substrate mounting solar cells 150. The substrate is secured in any convenient way to the outer ends of the hinged frames 106. In the stowed configuration of the solar array, the solar panel extends along the outer side of each frame 106 from its outer end to the first stiffener 120, then inwardly along one side of the scalloped stiffener flange 126 to the inner apex end of the stiffener, then outwardly along the adjacent side of the first wedge-shaped former 118 and around its outer apex edge, then inwardly along side of the scalloped flange of the next stiffener and outwardly to the next former, and so on to the last former. From the last former the panel extends to the next frame and so on around the entire spacecraft. The stiffener flanges 126 are bonded or otherwise secured to the solar panel substrate.

From the description, it is evident that the solar panel portions 102 are folded accordion fashion when the solar array is stowed. In this stowed configuration, the retaining cables 144 not only retain the solar panel support frames 106 in folded configuration, but also retain the stiffeners 120 and the cable support pins 146 in their stowed positions, best shown in FIG. 6. When the cables are severed, the frames 106 swing out under centrifugal force or spring action and the stiffeners 120 and pins 146 are released. As the arms swing out, the solar panel 104 is tensioned circumferentially. This tensioning action straightens out or unfolds the accordion panel folds 102. The stiffeners remain fixed to and unfold with the panel. In the fully deployed configuration of the solar array, the panel support frames 106 extend radially out from the spacecraft body 108 and the solar panel 104 surrounds the body in radially spaced relation in much the same way as in the deployed solar array of FIG. 2.

Figure 8:
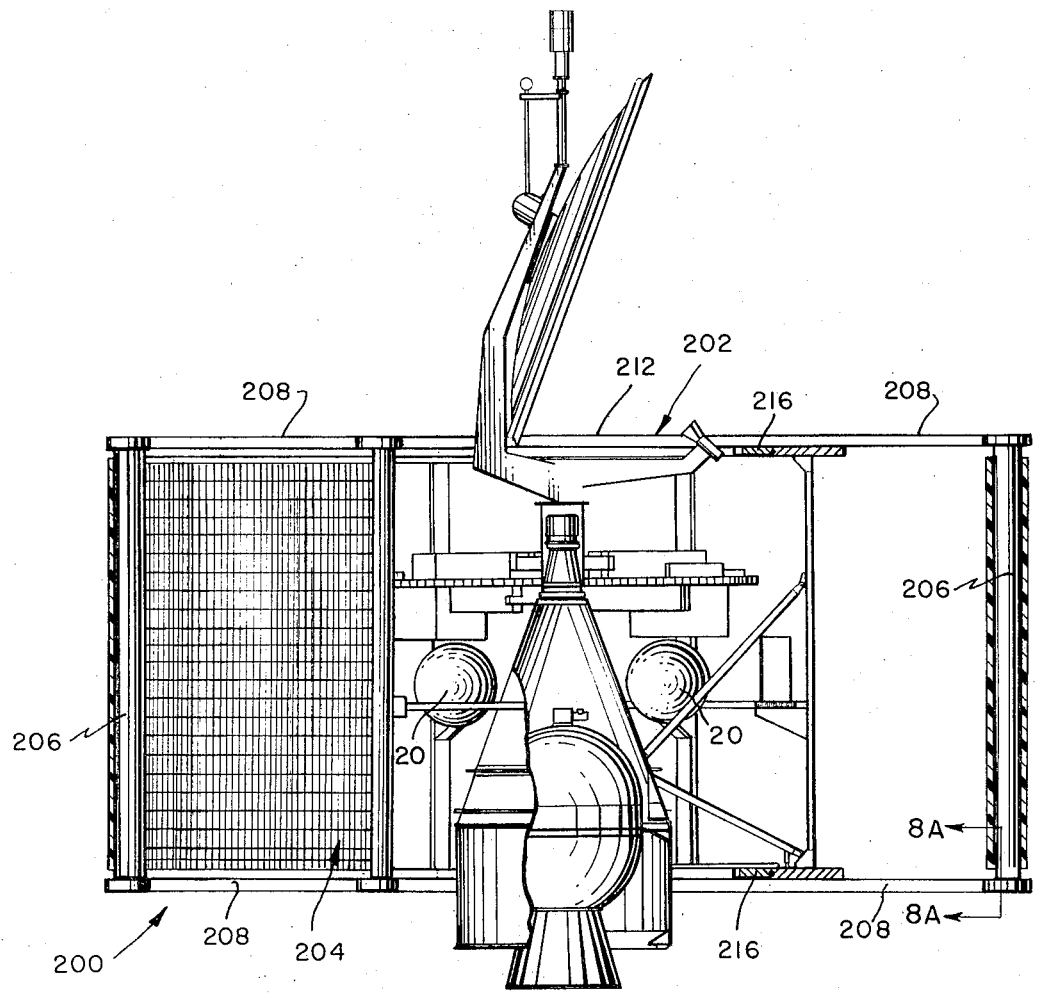
FIG. 8 is a side elevation partly in section of a spacecraft mounting a further modified solar array according to the invention.
Figure 8A:
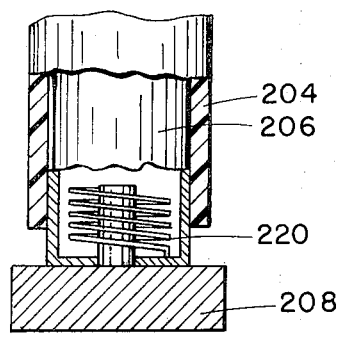
FIG. 8a is an enlarged section taken on line 82—82 in FIG. 8.
Figure 9:
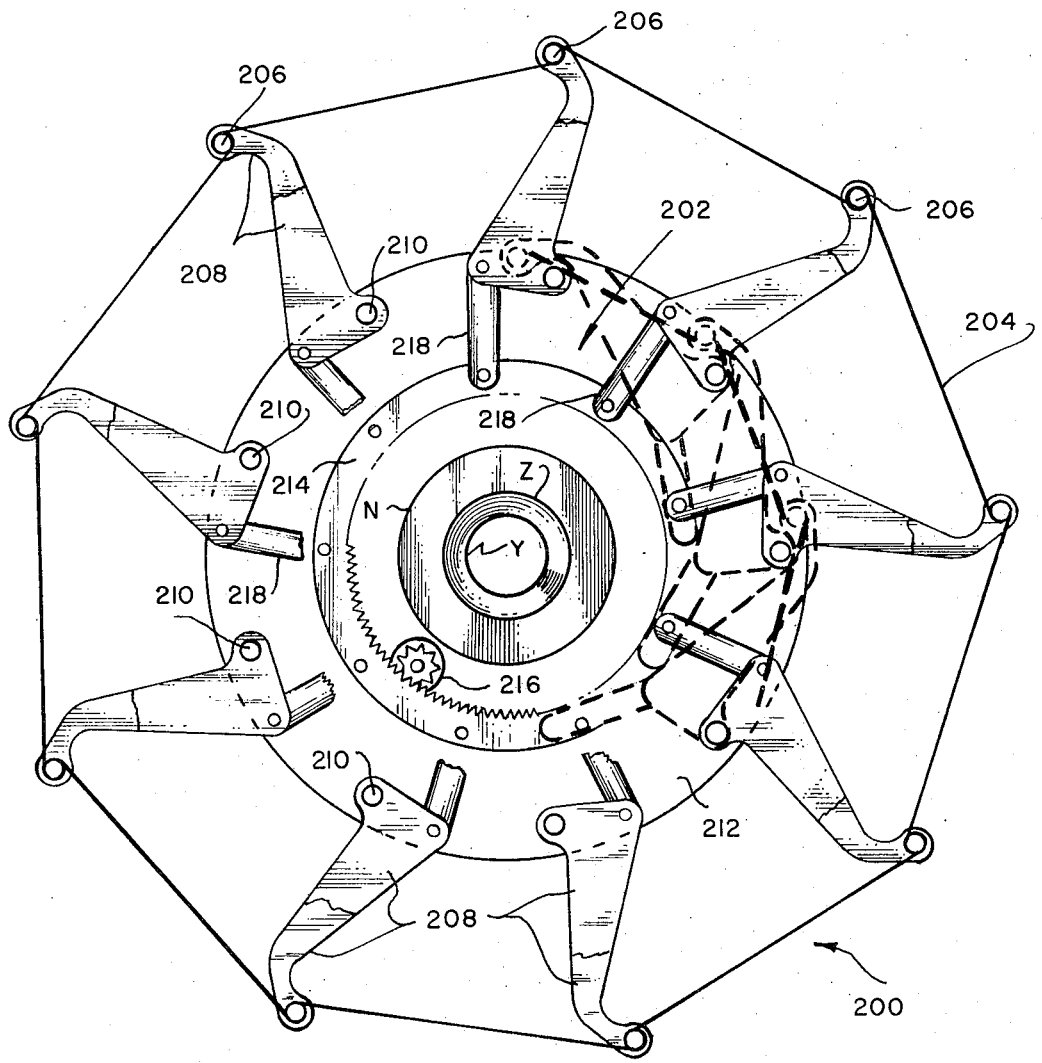
FIG. 9 is a bottom view of the spacecraft and solar array in FIG. 8.

The modified solar array 200 of FIGS. 8 and 9 is mounted on a spacecraft 202 like that in FIGS. 1 through 4. In this case, the solar panel 204 is attached at intervals to drums 206 rotatably supported between the outer ends of pairs of hinged arms 208 whose innner ends are pivotally attached at 210 to the ends of the spacecraft body 212. Rotatable on each end of the body is an internal ring gear 214 driven by a motor 216. Extending between and pivotally attached to the arms 208 and ring gears 214 are links 218. It is evident that rotation of the ring gears in one direction retracts the arms to stowed positions against the spacecraft body. Rotation of the ring gears in the opposite direction extends the arms to the deployed positions shown. Drums 206 are biassed window shade fashion by springs 220 to wind up the solar panel 204 and thereby take up the panel slack when the arms are retracted. The drums rotate against spring action to permit the solar panel to unwind from the drums when the arms are deployed.

What is claimed as new in support of Letters Patent is:

1. A spacecraft comprising:
a spacecraft body having a central axis;
an annular flexible solar panel circumferentially surrounding said body and having essentially the same overall circumferential dimension in every plane normal to said axis and intersecting said panel whereby said panel intersects radial planes containing the longitudinal axis of said spacecraft body along lines of intersection substantially parallel to said axis; and
relatively rigid panel mounting means on and spaced circumferentially about said body and secured to said panel along certain of said intersection lines spaced about said panel, said mounting means supporting said solar panel on said body for radial contraction of said panel to a launch configuration wherein the panel extends about said body in close conforming relation to the body and has an effective diameter approximating the diameter of said body and radial deployment of said panel to a deployed configuration wherein the panel is disposed in surrounding outwardly, radially spaced relation to said body and has an outer effective surface area exceeding substantially the surface area of said body.

2. A spacecraft according to claim 1 wherein:
said mounting means comprise frames having inner ends hinged to the circumference of said body on pivot axes parallel to the central axis of and spaced circumferentially about said body for swinging between retracted positions against the outside of the body and extended positions in generally radial planes of the body, and means securing the outer frame ends to said solar panel for contraction of said panel to launch configuration by swinging of said frames to retracted positions and expansion of said panel to deployed configuration by swinging of said frames to extended positions.

3. A spacecraft according to claim 2 wherein:
said solar panel has fold lines parallel to said body axis about which the panel is folded in said stowage configuration.

4. A spacecraft according to claim 3 wherein:
said panel is folded accordion-fashion in stowage configuration.

5. A spacecraft according to claim 3 wherein:
said panel in stowage configuration is folded under said frames.

6. A spacecraft according to claim 1 wherein:
said mounting means comprise frames having inner ends hinged to the circumference of said body on pivot axes parallel to the central axis of and spaced circumferentially about said body for swinging between retracted positions against the outside of said body and extended positions in generally radial planes containing said central body axis, and rotatable drums on the outer ends of said frames on which said solar panel is wound in stowage configuration and from which the panel unwinds during deployment of the panel by swinging of the frames to extended positions.

7. A spacecraft according to claim 6 wherein:
said drums are spring biassed to wind said panel on the drums during swinging of said frames to retracted position.

8. A spacecraft according to claim 1 wherein:

the mounting means comprise frames having inner ends hinged to tje circumference of said body on pivot axes parallel to the central axis of and spaced circumferentially about said body for swinging between retracted positions against the outside of the body and extended positions in generally radial planes of said body, and means securing the outer frame ends to said solar panel for contraction of said panel to launch configuration by swinging of said frames to retracted positions and expansion of said panel to deployed configuration by swinging of said frames to extended positions; and said solar panel in its launch configuration extends along the outside of each retracted frame from its inner end to its outer end, then under the outer end of the frame, and finally back on itself to the next frame to form a panel fold between the outer end of each frame and the spacecraft body.

9. A spacecraft according to claim 8 wherein:

said solar panel mounts solar cells which are located on the confronting sides of each fold; and means within each panel fold to prevent contact of the confronting solar cells.

10. A spacecraft according to claim 1 wherein:

said mounting means comprise frames having inner ends hinged to the circumference of said body on pivot axes parallel to the central axis of and spaced circumferentially about said body for swinging between retracted positions against the outside of the body and extended positions in generally radial planes of said body, and means securing the outer frame ends to said solar panel for contraction of said panel to launch configuration by swinging of said frames to retracted positions and expansion of said panel to deployed configuration by swinging of said frames to extended positions; and said solar panel in its launch configuration has a portion folded accordion-fashion within an opening at the inner end of each frame and extends from said opening along the outer side of the respective frame toward the outer frame end and then to the accordion folds in the opening of the next frame.

11. A spacecraft according to claim 10 including:

wedge shaped formers extending across the opening in each frame within the accordion folds of the panel and fixed to the respective frame; and a pair of stiffeners between each pair of adjacent formers secured to upper and lower edges of the adjacent panel fold and extending between the respective frame and the spacecraft body, and means releasibly securing each stiffener to the respective frame and the body for deployment of the stiffeners with said solar panel.

12. A deployable solar array for a spacecraft having a body comprising:

an annular flexible solar panel having a central axis encircled by the panel and having essentially the same overall circumferential dimension in every plane normal to said axis and intersecting said panel whereby said panel intersects radial planes containing said axis along lines of intersection substantially parallel to the axis;

a number of panel mounting frames spaced circumferentially about the inside of said panel and having outer ends adjacent said panel and opposite inner ends;

hinge means along said inner frame ends having hinge axes parallel to said central axis for pivotally mounting said frames about the circumference of said spacecraft body for swinging of said frames on axes parallel to said central axis between retracted positions wherein said frames extend generally circumferentially about said axis and extended positions wherein said frames are disposed in radial planes containing said axis; and means for securing said outer frame ends to said panel along certain of said intersection lines spaced circumferentially about said panel for radial contraction of the panel to a stowage configuration wherein the panel conforms generally to a cylindrical configuration of given diameter by swinging of said frames to retracted position and radial outward deployment of the panel to a deployed configuration wherein the panel conforms generally to a cylindrical configuration of a diameter exceeding substantially said given diameter by swinging of said frames to extended position.

13. A solar array according to claim 12 wherein:

said solar panel in its launch configuration extends along the outside of each retracted frame from its inner end to its outer end, then under the outer end of the frame, and finally back on itself to the next frame to form a panel fold behind the outer end of each retracted frame.

14. A solar array according to claim 13 wherein:

said solar panel mounts solar cells which are located on the confronting sides of each fold; and means within each panel fold to prevent contact of the confronting solar cells.

15. A solar array according to claim 14 wherein:

said solar panel in its launch configuration has a portion folded accordion-fashion within an opening at the inner end of each frame and extends from said opening along the outer side of the respective frame toward the outer frame end and then to the accordion folds in the opening of the next frame.

16. A solar array according to claim 15 including:

wedge-shaped formers extending across the opening in each frame within the accordion folds of the panel and fixed to the respective frame; and a pair of stiffeners between each pair of adjacent formers secured to upper and lower edges of the adjacent panel fold and means releasibly joining said stiffeners and frames.

17. A solar array according to claim 12 wherein:

said securing means comprise rotatable drums on the outer ends of said frames on which said solar panel is wound in stowage configuration and from which the panel unwinds during deployment of the panel by swinging of the frames to extended positions.

18. A solar array according to claim 17 wherein:

said drums are spring biased to wind said panel on the drums during swinging of said frames to retracted position.

* * * * *